Nov. 30, 1943.                E. R. BERGMANN                 2,335,477
           SHAKER CONVEYER TROUGH SUPPORTING AND CONNECTING MEANS
                    Filed May 15, 1942            2 Sheets-Sheet 1
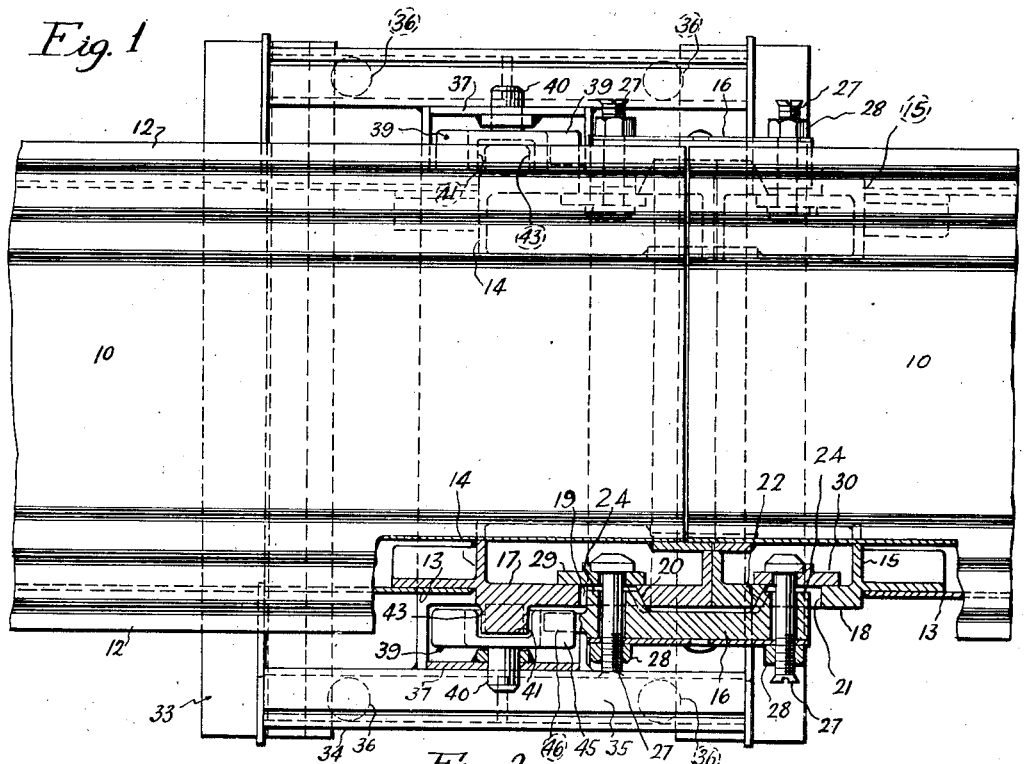
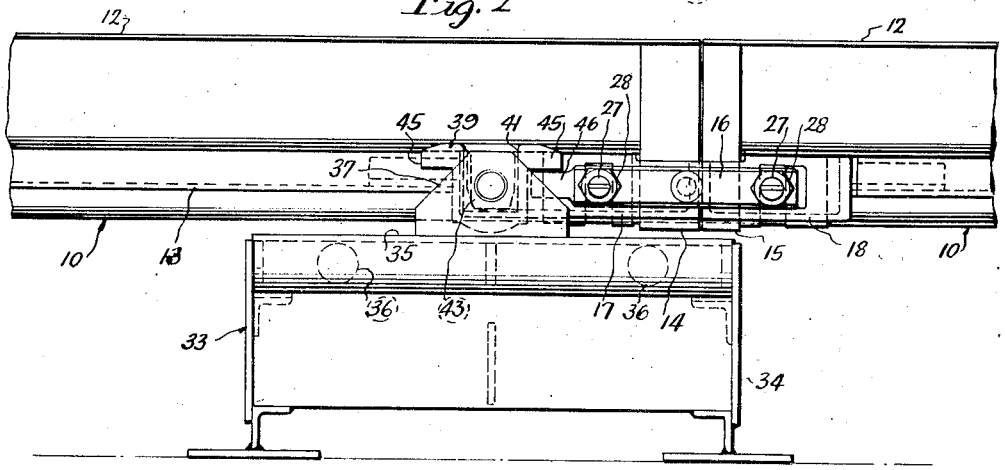
INVENTOR.
Ernst R. Bergmann
BY
Clarence F. Poole
ATTORNEY Nov. 30, 1943.                E. R. BERGMANN                2,335,477
SHAKER CONVEYER TROUGH SUPPORTING AND CONNECTING MEANS
Filed May 15, 1942                    2 Sheets-Sheet 2
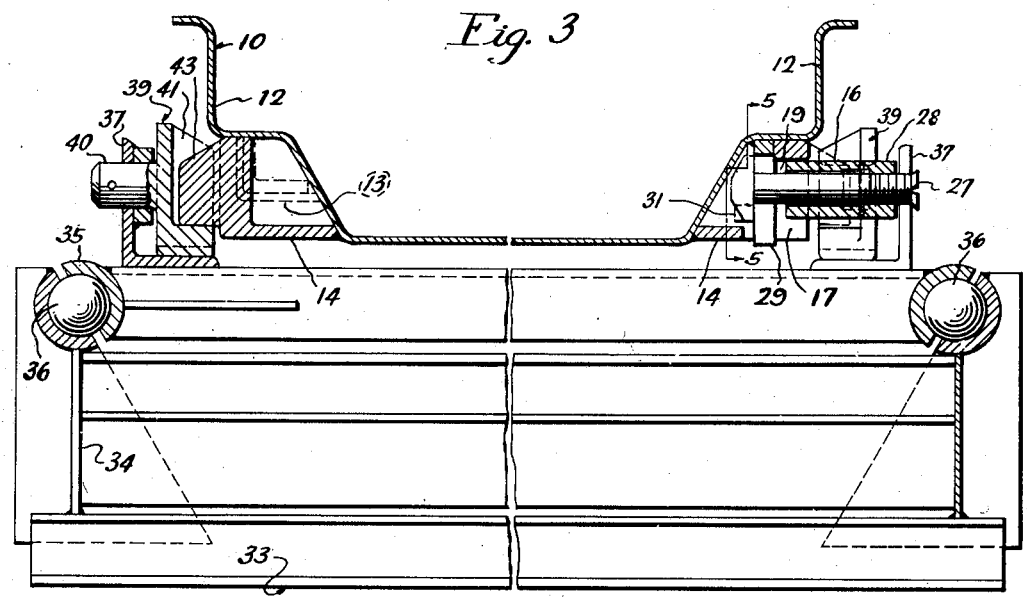
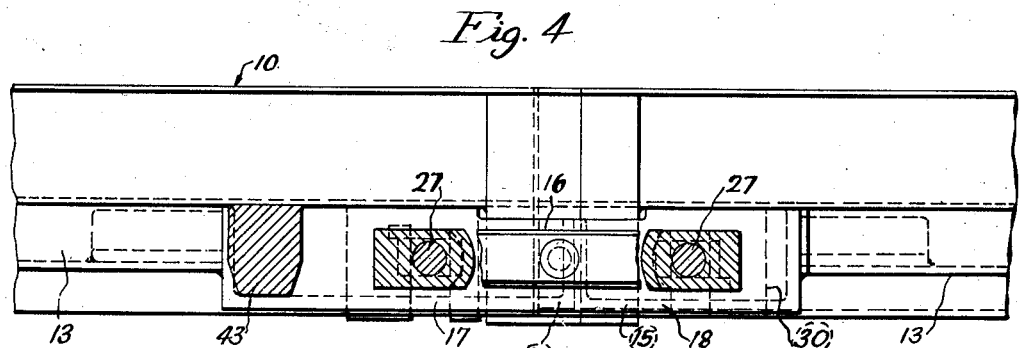
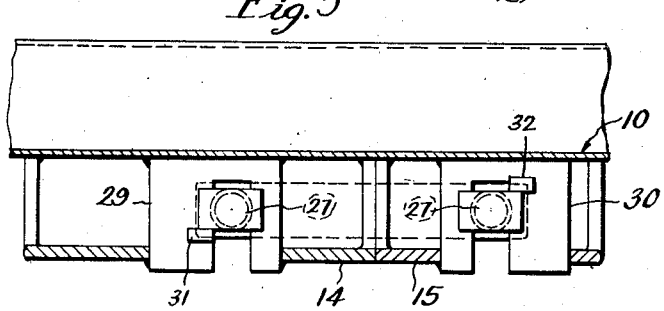
INVENTOR.
Ernst R. Bergmann
BY
Clarence F. Poole
ATTORNEY Patented Nov. 30, 1943

2,335,477

UNITED STATES PATENT OFFICE 2,335,477

SHAKER CONVEYER TROUGH SUPPORTING AND CONNECTING MEANS

Ernst R. Bergmann, Evergreen Park, Ill., assignor to Goodman Manufacturing Company, Chicago, Ill., a corporation of Illinois Application May 15, 1942, Serial No. 443,057

7 Claims. (Cl. 198—220)

This invention relates to improvements in shaker conveyer trough supporting and connecting means.

The principal objects of my invention are to provide a novel form of connecting means for adjacent ends of a pair of trough sections of a conveyer trough line which also serves to hold the trough sections in engagement with the reciprocating supporting means therefor.

The device of my present invention is constructed along lines somewhat similar to the trough connecting means disclosed in Patent No. 2,283,825, granted to William W. Sloane on May 19, 1942, but differs therefrom in the arrangement of the connecting members and in that the connecting members also serve to hold the associated trough sections from vertical movement with respect to their reciprocating supporting means.

Other objects of my invention will appear from time to time as the following specification proceeds and with reference to the accompanying drawings wherein:

Figure 1 is a fragmentary plan view of adjacent ends of two trough sections of a shaker conveyer trough line, with certain parts broken away and certain other parts shown in horizontal section in order to more clearly illustrate certain details of my invention;

Figure 2 is a view in side elevation of the trough sections and supporting means therefor shown in Figure 1;

Figure 3 is a transverse sectional view taken through one of the trough sections and its supporting means;

Figure 4 is an enlarged side elevational view of the trough sections removed from their supporting means, with certain parts shown in longitudinal section in order to more clearly illustrate certain details of my invention;

Figure 5 is a sectional view taken substantially along line 5—5 of Figure 3; and Figure 6 is an enlarged detail view showing certain details of the connecting members, for holding the trough sections in connected relation with respect to each other.

In the embodiment of my invention illustrated in the drawings, a plurality of shaker conveyer trough sections 10, 10 of a shaker conveyer trough line are shown as being connected in abutting relation with respect to each other. Said trough sections are of a usual construction with outwardly inclined flared sides 12, 12 and while shown as being connected in abutting relation with respect to each other, may be of a form which are connected in overlapping relationship, if desired.

The means for connecting the trough sections 10, 10 together includes a pair of abutment members 14, 14, secured to and projecting laterally from and extending along opposite sides of one end of one trough section 10 for a short part of the length thereof and extending along the next adjacent trough section 10 a slight distance. The ends of said abutment members are adapted to abut laterally projecting abutment members 15, 15 which project laterally from and extend along the next adjacent trough section 10 for a short part of the length thereof. Connecting members 16, 16 are adapted to engage and move said abutment members in abutting relation with respect to each other and to hold the trough sections together. Angle irons 13, 13 extend along the outsides of said trough sections and are secured thereto at the ends of their legs. Said angle irons are interposed between said members 14, 14 and 15, 15, and with the outsides of said trough sections and said abutting members, form box-like columns extending throughout the length of the conveyer trough line, to take the forces imparted to the trough sections during reciprocation of the conveyer.

The abutment members 14 and 15 are provided with integrally formed plate sections 17 and 18 respectively, extending therealong and spaced outwardly from said trough sections. Said plate section 17 is provided with an apertured portion 19, herein shown as opening towards the ground and as having an arcuately formed inclined bearing surface 20, formed in the form of the inside of a frusto-conical segment. Said plate section 18 is provided with a similar apertured portion 21 having an arcuately formed inclined bearing surface 22, inclined in a direction opposite from the bearing surface 20. Said inclined bearing surfaces are adapted to be engaged by oppositely inclined arcuately formed bearing surfaces 23, 23 of inwardly projecting portions 24, 24 of the connecting member 16, so arranged that movement of said connecting member towards said plate sections will draw adjacent ends of said trough sections together and hold them in connected relation with respect to each other.

Bolts 27, 27 having nuts 28, 28 threaded on the outer ends thereof are provided to move the connecting members 16, 16 towards the plate sections 17 and 18 and to hold the inclined bearing surfaces of said connecting members in engagement with the inclined bearing surfaces of said plate sections. Said bolts extend through elongated apertured portions of said connecting members, disposed adjacent opposite ends of said connecting members, and extend through engaging members 29 and 30 extending along the insides of the plate sections 17 and 18 respectively. Said engaging members are secured to the sides of the trough section and to said plate sections, and have apertured portions which open towards the ground and are wider than the diameter of said bolts to permit relative longitudinal movement between said bolts and engaging members during the tightening operation.

The heads of the bolts 27, 27 are of an elongated rectangular formation which will fit through the apertured portions 19 and 21 when turned in one direction, and which will extend across said apertured portions and engage the engaging member when turned so their longest dimension extends in a longitudinal direction. Said heads are adapted to engage stops 31 and 32, projecting inwardly from the engaging members 29 and 30 respectively, to prevent turning movement thereof. The outer threaded ends of said bolts are upset to prevent the nuts 28, 28 from being lost therefrom.

When it is desired to connect the trough sections 10, 10 together they are positioned in abutting relation with respect to each other, and the elongated rectangular heads of the bolts 27, 27 are inserted through the apertured portions 19 and 21 of the plate sections 17 and 18, respectively, and through the apertured portions of the engaging members 29 and 30, until the arcuately formed inclined bearing surfaces 23, 23 of the connecting members 16, 16 are in engagement with the inclined arcuately formed bearing surfaces 20 and 22 of the plate sections 17 and 18. At this time the heads of said bolts are turned until they engage the respective stops 31 and 32 and extend longitudinally of the conveyer. The nuts 28, 28 are then tightened to move the connecting members inwardly towards said plate sections and to draw and hold the trough sections together.

A ball frame 33 is provided to reciprocably support adjacent ends of the trough sections 10, 10. Said ball frame may be of any usual construction, and as herein shown includes a lower frame member 34 and an upper frame member 35 reciprocably mounted thereon on balls 36, 36 in the usual manner. Said upper frame member is provided with a pair of laterally spaced upright support brackets 37, 37 having socket members 39, 39 pivotally mounted thereon on pivotal pins 40, 40, herein shown as being formed integrally with said socket members. Said socket members, as herein shown, extend along the insides of said support brackets and are provided with sockets 41, 41 opening to the upper ends and inner sides thereof. Said sockets are adapted to receive supporting lugs 43, 43, projecting laterally from the abutment members 14, 14, for pivotally supporting the trough section 10 on said ball frame 33.

Each socket member 39 has a pair of lugs 45, 45 projecting longitudinally in opposite directions from the upper side thereof. The lug 45, which projects in the direction of the connecting member 16, is adapted to be engaged by a projecting portion 46 of the connecting member 16, to hold the trough from vertical movement with respect to said socket. Said projecting portion is moved into position beneath said lug, as the bearing surfaces of said connecting members are moved into engagement with the bearing surfaces of the plate sections 17 and 18, respectively.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a pair of conveyer trough sections, a reciprocating support therefor including a reciprocably movable frame, a socket on said frame adapted to be engaged by one of said trough sections, for supporting said trough sections on said frame, means for connecting said trough sections together, said means having a portion movable into engagement with said frame during the connecting operation, for holding said trough sections from vertical movement with respect to said frame.

2. In a shaker conveyer, a pair of conveyer trough sections, a reciprocating support therefor including a reciprocably movable frame, a connecting member, for connecting adjacent ends of said trough sections together, a socket on said frame adapted to be engaged by one of said trough sections, for supporting said trough section on said frame, said connecting member having a projecting portion having engagement with said frame, to prevent said trough sections from moving vertically with respect to said frame during reciprocation of the conveyer.

3. In a shaker conveyer, a pair of conveyer trough sections, a reciprocably movable frame for reciprocably supporting an end of one of said trough sections, and means for connecting adjacent ends of said trough sections together and holding one trough section in engagement with said frame, including a pair of abutting members extending along and projecting laterally from said trough sections, a connecting member having oppositely inclined engaging faces adapted to engage said members and to draw said members and trough sections together by movement towards said members, bolts extending through said members and said connecting member for drawing said connecting member towards said members, and said connecting member having a projecting portion movable into engagement with said reciprocably movable frame, upon movement of said connecting member to a connecting position, for holding said trough sections from vertical movement with respect to said frame.

4. In a connecting means for a pair of shaker conveyer trough sections, abutting members extending along and projecting laterally from adjacent ends of said trough sections, said members including plate sections extending longitudinally of and spaced from said trough sections and having oppositely inclined arcuately formed recessed bearing surfaces, a connecting member having projecting spaced apart arcuately formed oppositely inclined bearing faces corresponding with and engageable with opposite faces of said plate sections, and means for drawing said connecting member towards said plate sections and drawing adjacent ends of said trough sections together including bolts extending through said connecting member and having elongated heads having slidable engagement with the insides of said plate sections, nuts on said bolts, and said heads being adapted to be turned to fit through said recessed portions of said plate sections, to permit removal of said connecting member and bolts from said plate sections without removing said nuts from said bolts.

5. In a connecting means for a pair of shaker conveyer trough sections, abutting members extending along and projecting laterally from adjacent ends of said trough sections, said members including plate sections extending longitudinally of and spaced from said trough sections and having oppositely inclined arcuately formed recessed bearing surfaces, a connecting member having projecting spaced apart arcuately formed oppositely inclined bearing faces engageable with opposite faces of said plate sections, and means for drawing said connecting member towards said plate sections and drawing adjacent ends of said trough sections together including bolts extending through said connecting member, nuts on said bolts, and elongated heads on said bolts having slidable engagement with the insides of said plate sections, and arranged to move to a position to be removed through said recessed portions upon loosening of said nuts, to permit removal of said connecting member from said plate sections, without removing said nuts from said bolts.

6. In a connecting means for a pair of shaker conveyer trough sections, abutting members extending along and projecting laterally from adjacent ends of said trough sections, said members including plate sections extending longitudinally of and spaced from said trough sections and having oppositely inclined recessed bearing surfaces, a connecting member having projecting spaced apart oppositely inclined bearing faces engageable with opposite bearing faces of said plate sections, and means for drawing said connecting member towards said plate sections and drawing adjacent ends of said trough sections together including bolts extending through said connecting member, nuts on said bolts, and elongated heads on said bolts having slidable engagement with the insides of said plate sections and arranged to be moved to a vertically extending position upon loosening of said nuts from said bolts so as to be withdrawn from said plate sections through said recessed portions, to permit removal of said connecting member from said plate sections without removing said nuts from said bolts.

7. In a shaker conveyer, a pair of conveyer trough sections, a ball frame for supporting an end of one of said trough sections and including a lower frame member and an upper frame member mounted for reciprocable movement along said lower frame member, a supporting connection between said one trough section and upper frame member including a socket member transversely pivoted to said upper frame member, a part projecting laterally from said one trough section and having engagement with the socket of said socket member, for supporting said trough section on said ball frame, and means for connecting said trough sections together, said means having a projecting portion having engagement with said socket member, to hold said projecting part in engagement with said socket member during reciprocation of the conveyer.

ERNST R. BERGMANN.